(12) United States Patent
Hormell

(10) Patent No.: US 12,328,057 B1
(45) Date of Patent: Jun. 10, 2025

(54) SYSTEM AND METHOD FOR RECOVERING WASTED KYNETIC ENERGY IN A VEHICLE

(71) Applicant: Jack Hormell, Speedway (IN)

(72) Inventor: Jack Hormell, Speedway (IN)

( * ) Notice: Subject to any disclaimer, the term of this patent is extended or adjusted under 35 U.S.C. 154(b) by 178 days.

(21) Appl. No.: 18/230,271

(22) Filed: Aug. 4, 2023

Related U.S. Application Data

(60) Provisional application No. 63/395,676, filed on Aug. 5, 2022, provisional application No. 63/472,398, filed on Jun. 12, 2023.

(51) Int. Cl.
*H02K 7/18* (2006.01)
*F16C 32/04* (2006.01)
*H02K 7/09* (2006.01)

(52) U.S. Cl.
CPC ....... *H02K 7/1846* (2013.01); *F16C 32/0436* (2013.01); *H02K 7/09* (2013.01)

(58) Field of Classification Search
CPC ...... H02K 7/1846; H02K 7/09; F16C 32/0436
USPC ........................................ 310/90.5
See application file for complete search history.

(56) References Cited

U.S. PATENT DOCUMENTS

| | | | | |
|---|---|---|---|---|
| 1,913,371 A * | 6/1933 | Cleaver | ........... | H02K 51/00 290/23 |
| 4,405,872 A * | 9/1983 | Thomas | ........... | B60K 25/08 322/3 |
| 5,817,000 A | 10/1998 | Souder | | |
| 5,950,239 A | 9/1999 | Lopez | | |
| 6,453,204 B1 | 9/2002 | Rhodes | | |
| 6,470,933 B1 * | 10/2002 | Volpi | ........... | B60C 19/00 156/130.7 |
| 7,354,393 B2 | 4/2008 | Ardizzne et al. | | |
| 7,624,830 B1 * | 12/2009 | Williams | ........... | B60K 7/0007 180/65.6 |
| 8,308,627 B2 | 11/2012 | Friberg | | |
| 9,550,067 B1 | 1/2017 | Fischell et al. | | |
| 10,136,699 B1 | 11/2018 | Tse | | |
| 10,238,888 B2 | 3/2019 | Bean | | |
| 2001/0008191 A1 * | 7/2001 | Smith | ........... | B60L 8/00 180/65.265 |
| 2002/0151760 A1 | 10/2002 | Paturu | | |

(Continued)

FOREIGN PATENT DOCUMENTS

CN 107080322 A 8/2017

*Primary Examiner* — Ahmed Elnakib
(74) *Attorney, Agent, or Firm* — John Rizvi; John Rizvi, P.A.—The Patent Professor®

(57) ABSTRACT

A kinetic energy recovery system may include a first rotatable assembly, attachable to and jointly rotatable with a vehicle wheel assembly, and a second rotatable assembly, rotatably mountable on a wheel axle of the vehicle wheel assembly and independently rotatable about the wheel rotation axis with respect to the first rotatable assembly. The first and second rotatable assemblies may include a first and a second plurality of magnets, respectively. The second rotatable assembly may be rotatable about the wheel rotation axis by a magnetic field produced between the first plurality of magnets and the second plurality of magnets. The system may include a stator, mountable about the wheel axle. The second rotatable assembly may produce an electrical current in the stator responsively to a rotation of the second rotatable assembly about the wheel rotation axis.

35 Claims, 9 Drawing Sheets

(56) References Cited

U.S. PATENT DOCUMENTS

| | | | |
|---|---|---|---|
| 2003/0227227 A1* | 12/2003 | Tu | B60K 1/00 |
| | | | 310/92 |
| 2005/0101828 A1 | 5/2005 | Butler et al. | |
| 2007/0292463 A1 | 12/2007 | Spector | |
| 2008/0019917 A1 | 1/2008 | Pacey | |
| 2008/0087288 A1 | 4/2008 | Wun | |
| 2010/0130945 A1 | 5/2010 | Laniado et al. | |
| 2012/0316382 A1 | 12/2012 | Edwards | |
| 2012/0317843 A1 | 12/2012 | Bove | |
| 2014/0082971 A1 | 3/2014 | Chang | |
| 2014/0194668 A1 | 7/2014 | Hanson | |
| 2017/0361093 A1 | 12/2017 | Yoo et al. | |
| 2019/0307182 A1 | 10/2019 | Wiley | |
| 2021/0075289 A1* | 3/2021 | Yada | H02K 3/522 |

\* cited by examiner

SYSTEM AND METHOD FOR RECOVERING WASTED KYNETIC ENERGY IN A VEHICLE

CROSS-REFERENCE TO RELATED APPLICATIONS

This application claims the benefit of U.S. Provisional Patent Application No. 63/395,676, filed on Aug. 5, 2022, and U.S. Provisional Patent Application No. 63/472,398, filed on Jun. 12, 2023, which are incorporated herein in their entirety.

FIELD OF THE INVENTION

The present invention relates generally to energy conversion in a vehicle, and more specifically, to a system and method for recovering wasted kinetic energy of a vehicle wheel/hub assembly using the recovered wasted kinetic energy to produce electricity, such as for recharging the vehicle's onboard battery or batteries.

BACKGROUND OF THE INVENTION

Many types of vehicles include one or more onboard batteries configured to at least partially power the vehicle to displace along a ground, terrain, water body, or other medium, and/or to power electrical devices carried by or associated with the vehicle. For example, fuel-powered vehicles may include one or more onboard batteries which may facilitate starting the vehicle. Hybrid vehicles may include one or more onboard batteries configured to electrically power the vehicle for displacement under certain circumstances, such as, but not limited to, at lower speeds and higher torques. All-electric vehicles may include one or more onboard batteries configured to fully power the vehicle's electrical motor in charge of driving the vehicle for displacement. Vehicles such as RVs, campervans, and boats may include one or more auxiliary batteries configured to provide alternating current (AC) or direct current (DC) to appliances such as refrigerators, cooling or heating devices, water pumps, etc. to power the appliances. In addition, the battery or batteries of virtually any type of vehicle may be further used for powering additional electrical systems comprised in the vehicle, such as, but not limited to, an onboard processor or control unit, lights, an audio system, etc.

Onboard vehicle batteries may be recharged in various ways. For example, during operation of a fuel-powered vehicle, a vehicle alternator may convert rotational energy from the vehicle engine into electrical energy configured to power the vehicle's electrical systems and recharge the vehicle's onboard battery or batteries. Electric vehicles, in turn, may include systems configured to convert mechanical energy, such as from the vehicle braking system, into electrical power, in order to partially recharge the onboard battery or batteries during operation of the vehicle. Furthermore, the batteries may be recharged by an external electrical power source, such as the electrical power grid, when the vehicles are not in use.

As hybrid and all-electric vehicles use battery power to partially or entirely power the vehicle engine, the onboard battery or batteries will typically run out of power within a relatively small amount of time- or distance-. The distance an electric or hybrid vehicle may operate before the onboard battery runs out of power, or vehicle 'range', is currently significantly lower than the distance an equivalent fuel-powered vehicle may operate before running out of fuel. This, among other reasons, has caused electric vehicle penetration to-date to be lower than anticipated or desired.

Accordingly, there is an established need for solutions capable of increasing a hybrid or all-electric vehicle range.

SUMMARY OF THE INVENTION

The present invention is directed to a kinetic energy recovery system and method for converting wasted kinetic energy of a vehicle wheel into electrical energy, such as to recharge a vehicle battery. The kinetic energy recovery system may include a first rotatable assembly, which may be attached to and jointly rotate with a vehicle wheel assembly, and a second rotatable assembly, which may be rotatably mounted onto the first rotatable assembly and may independently rotate about the wheel rotation axis with respect to the first rotatable assembly. The first and second rotatable assemblies may include a first and a second plurality of magnets, respectively. The second rotatable assembly may be rotatable about the wheel rotation axis by a magnetic field produced between the first plurality of magnets and the second plurality of magnets. The system may include a stator, mountable about the wheel axle. The second rotatable assembly may produce an electrical current in the stator responsively to a rotation of the second rotatable assembly about the wheel rotation axis.

In a first implementation of the invention, a wasted kinetic energy recovery system may include a first rotatable assembly, attachable to a vehicle wheel assembly to rotate jointly with the vehicle wheel assembly about a wheel rotation axis of the vehicle wheel assembly. The first rotatable assembly may include a first plurality of magnets. The system mat further include a second rotatable assembly, comprising a second plurality of magnets and one or more rotor magnets. The system may additionally include a stationary assembly comprising a stator. The wasted kinetic energy recovery system may be configured to adopt a working configuration in which the stationary assembly is mounted about the wheel axle of the vehicle wheel assembly and is non-rotatable about the wheel rotation axis, and the first rotatable assembly is attached to the vehicle wheel assembly and is driven for rotation about the wheel rotation axis by and jointly with the vehicle wheel assembly. In the working configuration, the second rotatable assembly may be mounted about the wheel axle and may rotate about the wheel rotation axis with respect to the first rotatable assembly, the vehicle wheel assembly and the stationary assembly. Rotation of the second rotatable assembly with respect to the first rotatable assembly, the vehicle wheel assembly and the stationary assembly is driven by a first magnetic field produced between the first plurality of magnets of the first rotatable assembly and the second plurality of magnets of the second rotatable assembly. The rotation of the second rotatable assembly-and thus of the one or more rotor magnets comprised therein-produces an electrical current in the stator.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a kinetic energy recovery system and method for converting wasted kinetic energy of a vehicle wheel into electrical energy, such as to recharge a vehicle battery.

Figure 1:
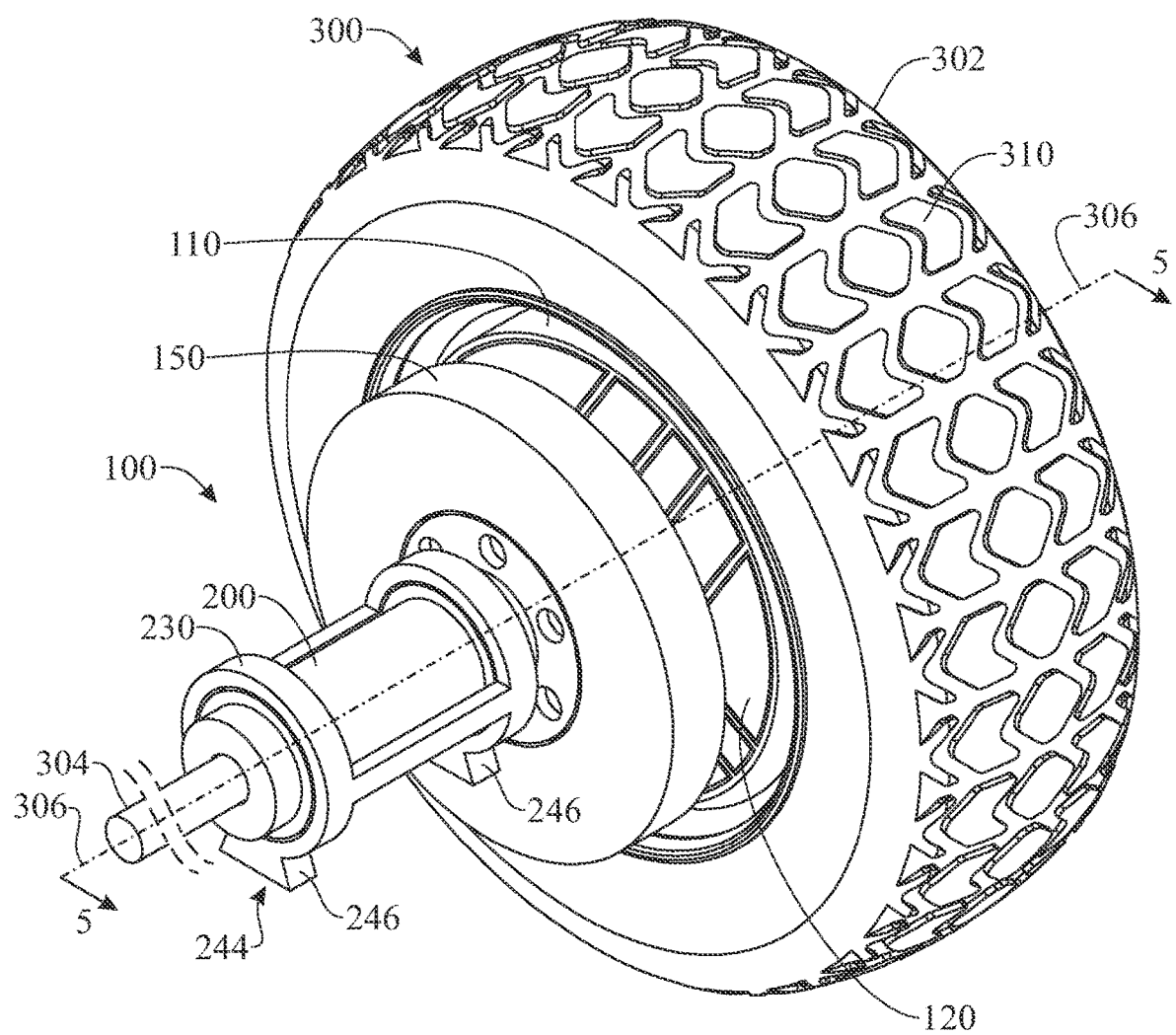
FIG. 1 presents a top isometric view of a vehicle wheel assembly provided with a kinetic energy recovery system in accordance with an illustrative embodiment of the present invention.
Figure 3:
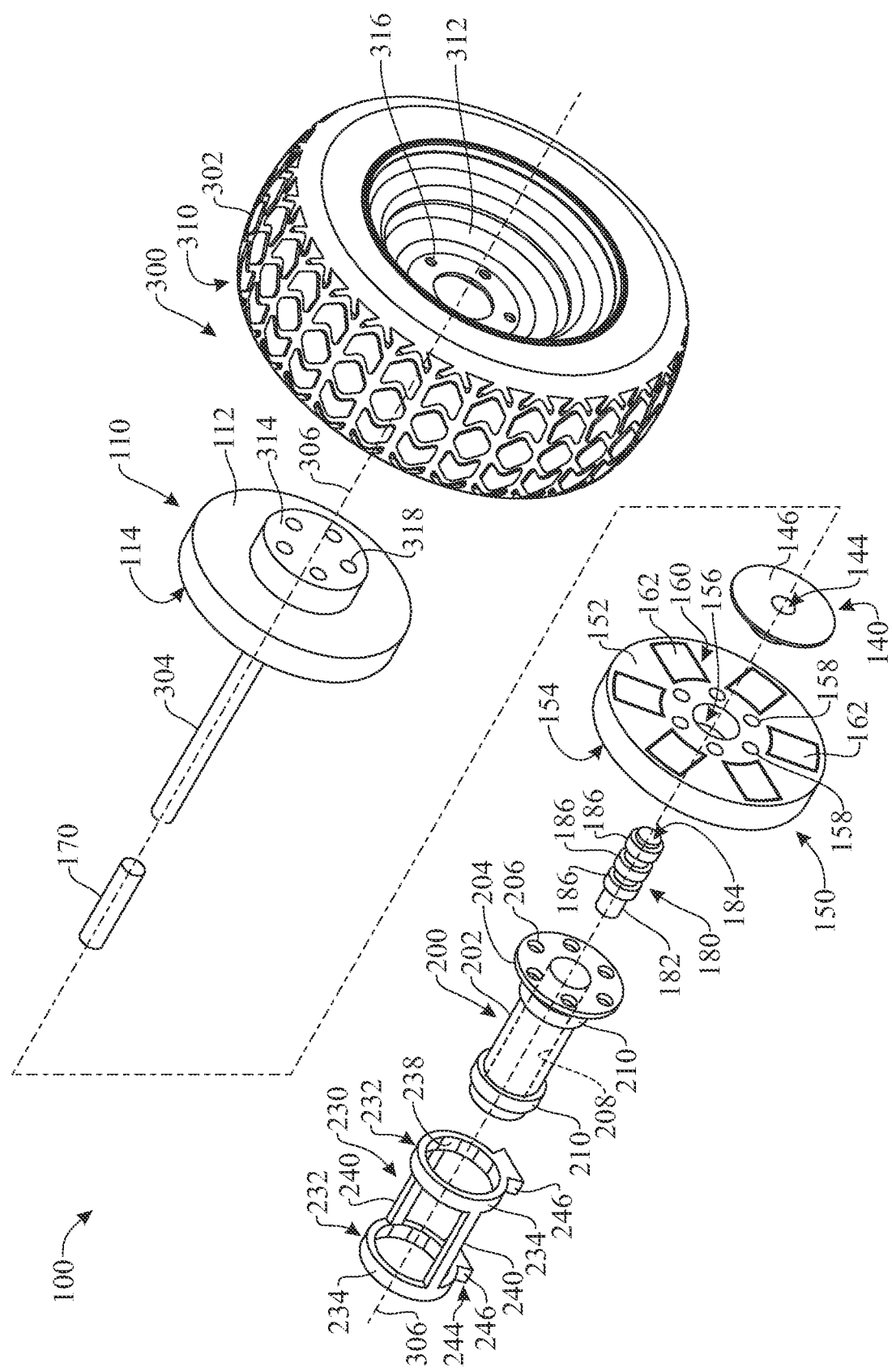
FIG. 3 presents an exploded, top isometric view of the vehicle wheel assembly and kinetic energy recovery system of FIG. 1, from an outer side of the vehicle wheel assembly.

Referring initially to FIGS. 1 and 3, a kinetic energy recovery system 100 is shown in accordance with an illustrative embodiment of the present invention. The kinetic energy recovery system 100 is configured to operate together with a vehicle wheel assembly 300, an example of which is shown in the drawings. Referring to FIG. 3, the illustrative vehicle wheel assembly 300 includes a wheel 302 connected to and jointly rotatable with a wheel axle 304 about a rotation axis 306. The wheel 302 may include a tire 310, a rim 312, and a hub 314. The tire 310 may be secured to the rim 312, which in turn may be attached to the hub 314 by lugs, bolts, or other fasteners, hereinafter referred to generally as fasteners 320 (FIG. 5), which may be connected to fastener openings 316 formed in the rim 312 and corresponding fastener openings 318 formed in the hub 314, for example as known in the art. The hub 314, in turn, may be attached to and jointly rotate with the wheel axle 304 about the rotation axis 306. The hub 314 may include the vehicle brakes and/or other wheel hub features, for example as known in the art, in some embodiments. The hub 314, as well as the tire 310 and rim 312, which are attached to the hub 314, are jointly rotatable with the wheel axle 304 about the rotation axis 306. It should be noted that alternative vehicle wheel assembly configurations are contemplated without departing from the scope of the present disclosure.

Figure 4:
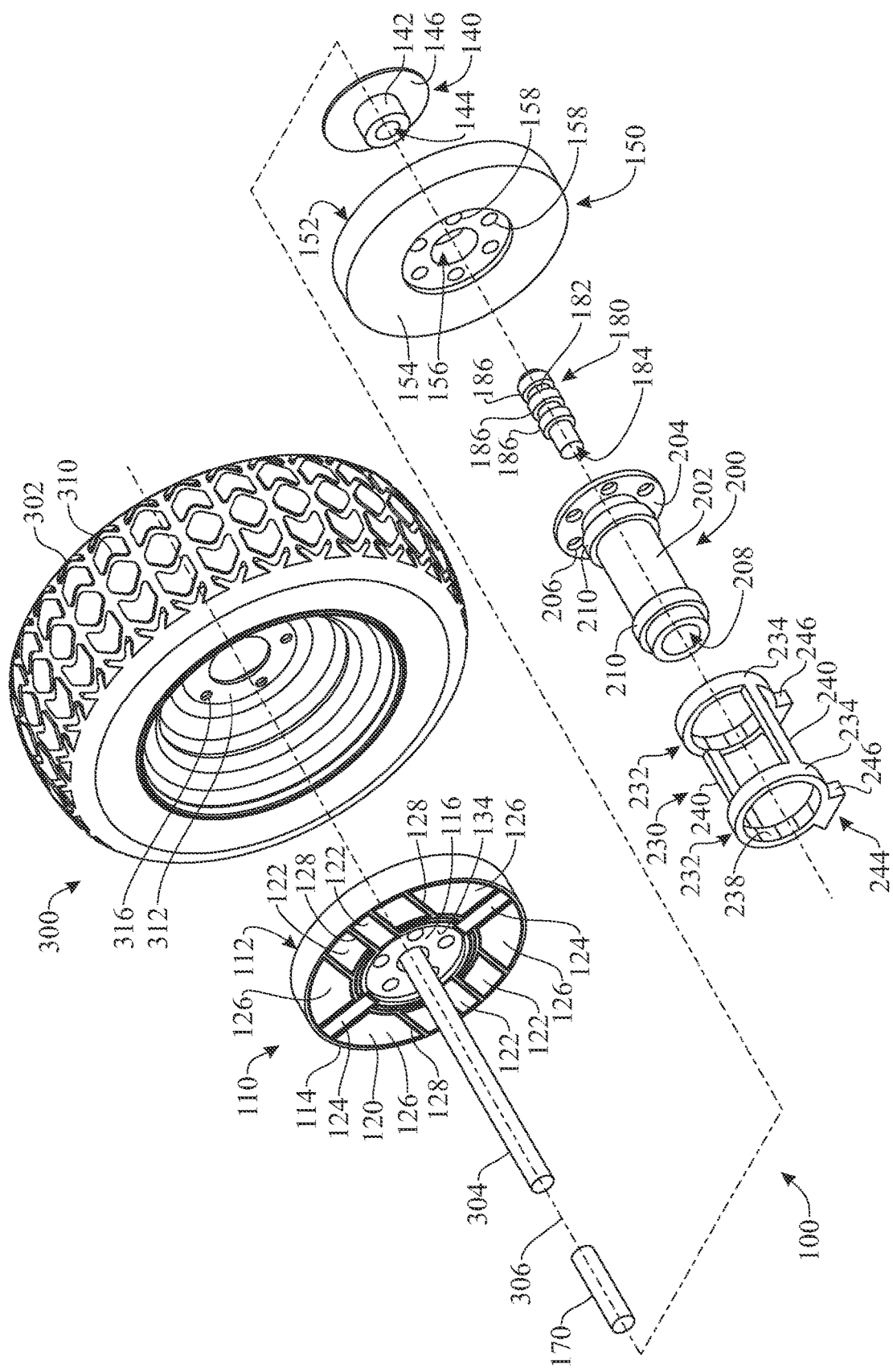
FIG. 4 presents an exploded, top isometric view of the vehicle wheel assembly and kinetic energy recovery system of FIG. 1, from an opposite, inner side of the vehicle wheel assembly.

With reference to FIGS. 3 and 4, the kinetic energy recovery system 100 may include a first disc 110, which may be attached to and jointly rotatable with the wheel assembly 300 about the rotation axis 306. For example, the first disc 110 may be bolted or otherwise attached to the hub 314 of the wheel assembly 300. In preferred embodiments, the first disc 110 is a preferably solid, circular or disc-shaped body, made for instance of a non-ferrous material, such as, but not limited to, copper. The first disc 110 may be generally planar and extend radially outward and generally perpendicular to the rotation axis 306. In a non-limiting example, the first disc 110 may be about 2 inches thick and 8 to 18 inches in diameter. The first disc 110 may be concentric and coaxial with the hub 314, with the rotation axis 306 arranged at, and extending through, the center of the first disc 110. In some embodiments, the first disc 110 may be wider, i.e. have a larger diameter with respect to the central, rotation axis 306, than the hub 314, as shown.

With continued reference to FIGS. 3 and 4, the first disc 110 may include an outer side 112 facing the wheel 302, and an opposite, inner side 114 oriented to face the center line or longitudinal axis of the vehicle. As shown in FIG. 4, the first disc 110 may further include a plurality of magnets 120. Each magnet 120 of the plurality of magnets 120 may have opposite polarity with respect to adjacent magnets 120 of the plurality of magnets 120. In a non-limiting example, each magnet of the plurality of magnets 120 may exert a pull/repulsion force of 35 lbs. In some embodiments, the plurality of magnets 120 may be provided closer to the inner side 114 than to the outer side 112 of the first disc 110; for example, in some embodiments, such as the present embodiment, the plurality of magnets 120 may be located on the inner side 114 of the first disc 110, such as adhered to the inner side 114 by an epoxy resin or other adhesive. As shown for instance in FIG. 5, in some embodiments, such as the present embodiment, the plurality of magnets 120 may be arranged within one or more cavities 118 recessed into the inner side 114. Alternatively or additionally, the plurality of magnets 120 may be arranged along a generally radial plane with respect to the rotation axis 306 of the vehicle wheel assembly 300, i.e. a plane that is perpendicular to the rotation axis 306. In some embodiments, such as the present embodiment, the plurality of magnets 120 may be arranged radially outward of the hub 314, and preferably surrounding the hub 314 along an entire periphery thereof. In preferred embodiments, the plurality of magnets 120 may be disposed in an annular arrangement about a central portion 116 of the first disc 110. In some embodiments, the central portion 116 of the first disc 110 may include an opening, at which the hub 314 may be received; in other embodiments, the central portion 116 of the first disc 110 may include a first disc hub, to which the hub 314 of the vehicle wheel assembly 300 may be secured such as by bolts or other fasteners. In some embodiments, the plurality of magnets 120 may be generally planar or flat, as shown.

With continued reference to FIG. 4, in some embodiments, the plurality of magnets 120 may include at least one magnet 122 elongately formed in a first direction and at least one magnet 124 elongately formed in a second direction which is different, and optionally perpendicular, to the first direction; in some embodiments, the plurality of magnets 120 may more specifically include two or more magnets 122 elongately formed in the first direction and thus parallel to each other, and two or more magnets 124 elongately formed in the second direction and thus parallel to each other and arranged at an angle (e.g., 90 degrees) with respect to the two or more magnets 122. For example, the present embodiment includes two groups of three magnets 122 each, the magnets 122 elongately formed along the first direction, and a pair of magnets 124, each magnet 124 elongately formed along a perpendicular, second direction. The two groups of three magnets 122 are arranged in diametral opposition with respect to one another and relative to the rotation axis 306. In turn, the pair of magnets 124 are arranged in diametral opposition with respect to one another and relative to the rotation axis 306. In some embodiments, the plurality of magnets 120 may include one or more arcuate magnets 126. In the non-limiting example shown in the drawings, four arcuate magnets 126 are specifically provided, each arcuate magnet 126 arranged between adjacent magnets 122 and 124. Adjacent magnets 122, 124, 126 may be preferably slightly spaced apart with one another by respective, elongated gaps 128, as shown. The gaps 128 may extend, for instance, either in the first direction or the second direction.

With reference to FIGS. 3 and 4, the kinetic energy recovery system 100 may comprise a bearing 140 and a second disc 150. The bearing 140 and second disc 150 are fitted over the wheel axle 304. The bearing 140 interfaces between the second disc 150 and the wheel axle 304 and facilitates a generally free rotation of the second disc 150 and the wheel axle 304 relative to one another about the wheel rotation axis 306, i.e. prevents rotation of the wheel axle 304 from being transmitted to the second disc 150 and vice versa. As is described in greater detail hereinafter, the second disc 150 may interact with the first disc 110 by magnetic attraction, without making physical contact with the first disc 110, such that rotation of the first disc 110 about the rotation axis 306 causes the second disc 150 to freely rotate about the rotation axis 306.

In preferred embodiments, the bearing 140 may be a passive magnetic repulsion bearing, which allows for a contact-free levitation of the second disc 150 with respect to the wheel axle 304. The bearing 140 may include a main body 142 comprising a longitudinal through bore 144. In some embodiments, such as the present embodiment, the main body 142 of the bearing 140 may be generally cylindrical. A flange 146 may extend radially outward of the main body 142 about the rotation axis 306. The flange 146 may be circular, for instance and without limitation.

The second disc 150 may be tightly mounted over and onto the bearing 140, such as over and onto the main body 142 of the bearing 140. In turn, the longitudinal through bore 144 may be configured to receive the wheel axle 304. In some embodiments, the through bore 144 may generally conform in shape and size to the wheel axle 304 and may adjust to the wheel axle 304. In other embodiments, a passive magnetic sleeve 170 (FIG. 4), may be tightly sleeved onto and attached to the wheel axle 304, such as by an epoxy resin. The bearing 140 is mountable onto the sleeve 170 with the sleeve 170 received within the longitudinal through bore 144 of the bearing 140. The bearing 140 and sleeve 170 may be of like polarity, thus repelling each other and contributing to levitate the second disc 150 with respect to the wheel axle 304. In some embodiments, the sleeve 170 may have a magnetic field and gauss (G) which is the same as that of the bearing 140.

The second disc 150 may be a preferably solid, circular or disc-shaped body, made for instance of a non-ferrous material, such as, but not limited to, copper. The second disc 150 may be generally planar and extend radially outward and generally perpendicular to the rotation axis 306. In a non-limiting example, the second disc 150 may be about 2 inches thick and 8 to 18 inches in diameter. The second disc 150 may be concentric and coaxial with the first disc 110.

Figure 5:
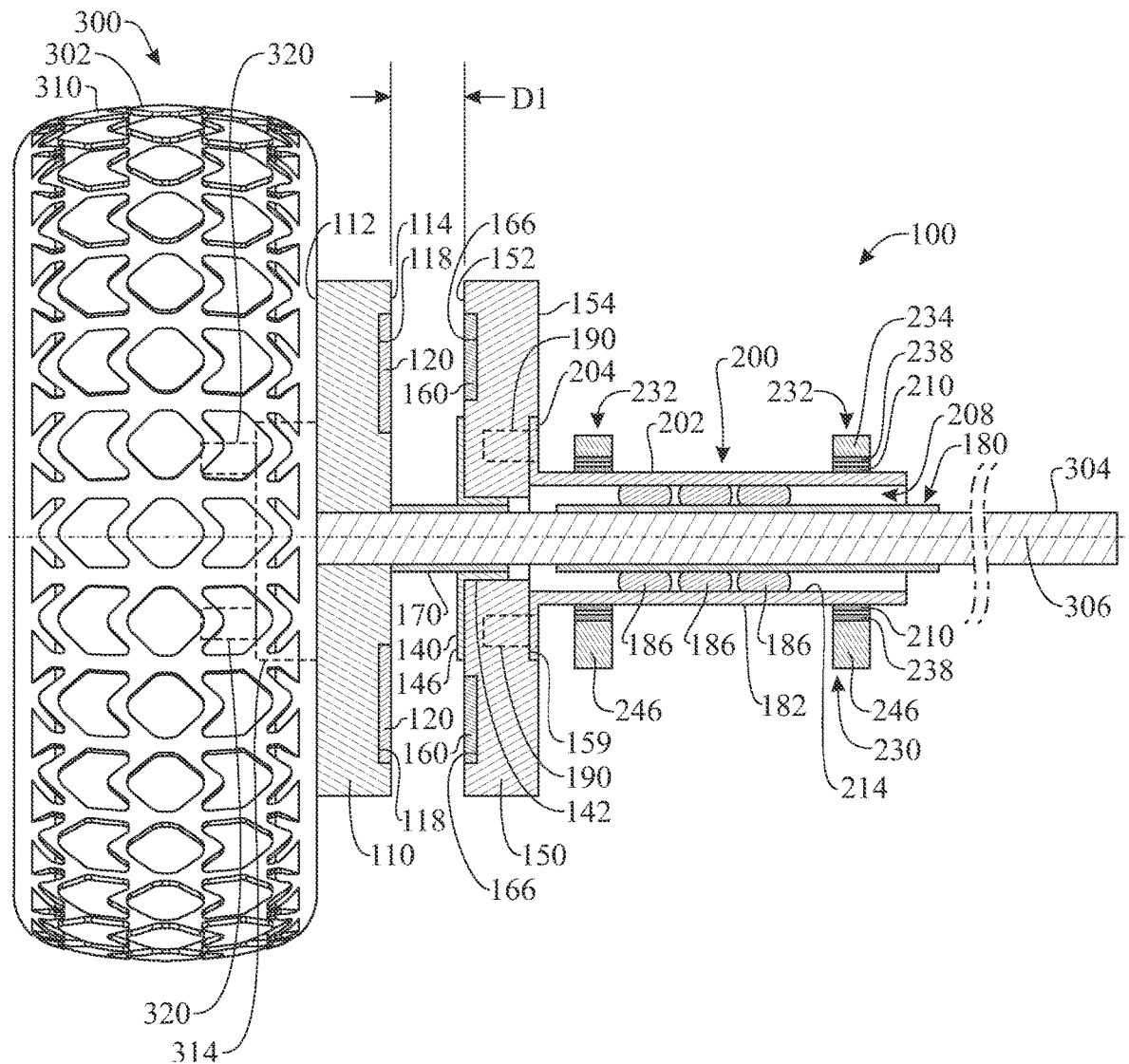
FIG. 5 presents a cross-sectional, side elevation view of the vehicle wheel assembly and kinetic energy recovery system of FIG. 1, the cross section taken along section plane 5-5 indicated in FIG. 1.

With reference to FIGS. 3 and 4, the second disc 150 may include an outer side 152 and an opposite, inner side 154. The outer side 152 may be oriented towards the wheel 302, facing the inner side 114 of the first disc 110, whereas the inner side 154 may be oriented to face the center line or longitudinal axis of the vehicle. A through bore 156 may be formed axially through the second disc 150. The bearing 140 may extend at least partially through the through bore 156, with the wheel axle 304, in turn, arranged extending through the bearing 140. More specifically, the main body 142 of the bearing 140 may be tightly fitted into the through bore 156, in a preferably permanent or non-disconnectable manner. In some embodiments, as best shown in FIG. 5, the flange 146 of the bearing 140, in turn, may rest on and be optionally attached to the outer side 152 of the second disc 150.

In some embodiments, the tight fitting of the main body 142 of the bearing 140 into the through bore 156 of the second disc 150 may be achieved by a thermal process. The thermal process may include the steps of heating the second disc 150, such as to 500 degrees Fahrenheit in an oven for 12 hours, causing the second disc 150 to expand, while simultaneously subjecting the bearing 140 to extreme cold, such as by placing the bearing 140 in a dry ice water bath. The submersed bearing 140 may then be placed in a freezer for a period of time, such as 12 hours, which will cause the bearing 140 to contract (get smaller in size). After this period of time, the bearing 140 and second disc 150 are joined together by fitting the main body 142 of the bearing into the through bore 156 of the second disc 150, and are allowed to return to room temperature, at which point the second disc 150 and bearing 140 will be permanently joined.

Figure 2:
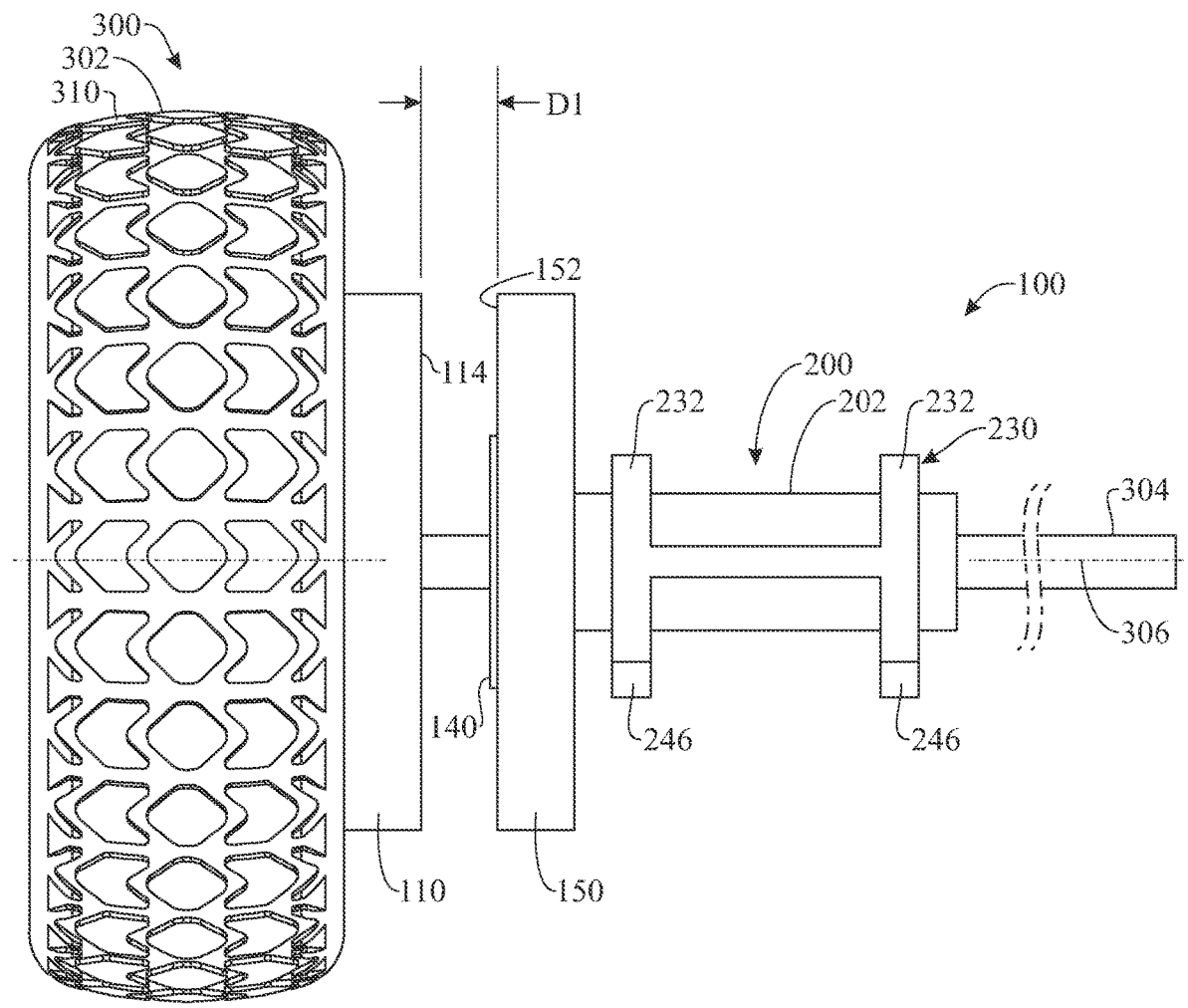
FIG. 2 presents a side elevation view of the vehicle wheel assembly and kinetic energy recovery system of FIG. 1.

The second disc 150 may further include a plurality of magnets 160, which may have the same polarity with respect to one another, and an opposite polarity with respect to the plurality of magnets 120 of the first disc 110. The plurality of magnets 160 of the second disc 150 may be separated from the plurality of magnets 120 of the first disc 110 by a distance "D1" as indicated in FIGS. 2 and 5. In a non-limiting example of the invention, each magnet 160 may be configured to exert a pull/repulsion force greater than 35 lbs. In some embodiments, the plurality of magnets 160 may be provided closer to the outer side 152 than to the inner side 154 of the second disc 150; for example, in some embodiments, such as the present embodiment, the plurality of magnets 160 may be located on the outer side 152 of the second disc 150, such as adhered to the outer side 152 by an epoxy resin or other adhesive. As shown for instance in FIG. 5, in some embodiments, such as the present embodiment, the plurality of magnets 160 may be arranged within one or more cavities 166 recessed into the outer side 152. Alternatively or additionally, the plurality of magnets 160 may be arranged along a generally radial plane, i.e. a plane that is perpendicular to the rotation axis 306 of the vehicle wheel assembly 300. In some embodiments, the plurality of magnets 160 may be arranged radially outward of the hub 314, and preferably in an annular arrangement around a central portion 164 of the second disc 150, similarly to the plurality of magnets 120 of the first disc 110; for example, the plurality of magnets 160 of the present embodiment comprises angularly-spaced-apart, radially extending magnets 162 surrounding the central portion 164 along an entire periphery thereof. In some embodiments, the plurality of magnets 160 may be generally planar or flat, as shown. The magnets 162 may be uniform in size, and angularly uniformly spaced apart with each other.

As described heretofore, the first and second discs 110 and 150 may be primarily made of a non-ferrous material, such as, but not limited to, copper. The first and second discs 110 and 150 being primarily non-ferrous may prevent magnetism from "bleeding" into the copper, and thereby allow to confine the magnetic forces within the space between the discs 110, 150.

With continued reference to FIGS. 3 and 4, the second disc 150 may include a plurality of fastener openings 158 formed about the through bore 156. The fastener openings 158 may be arranged angularly-spaced apart with one another along the periphery of the through bore 156. The fastener openings 158 may extend at least partially through the second disc 150. As best shown in FIG. 3, the fastener openings 158 may be arranged radially inward of the plurality of magnets 160, i.e. the plurality of magnets 160 may be arranged radially outward and around the plurality of fastener openings 158. As shown in FIG. 4, the plurality of fastener openings 158 may be formed in a central recessed area 159 of the central portion 164 of the second disc 150, the central recessed area 159 recessed into the inner side 154 of the second disc 150. The longitudinal through bore 144 may end at the central recessed area 159, as shown.

As further shown in FIGS. 3 and 4, the kinetic energy recovery system 100 may include a stator 180. The stator 180 may include a main body 182, which may be formed as a hollow, cylindrical tube or sleeve comprising a longitudinal through bore 184. In some embodiments, the main body 182 may be made of plastic, such as, but not limited to, polyvinyl chloride (PVC) tubing. As shown in FIG. 5, the main body 182, and more specifically, the longitudinal through bore 184, may be configured to receive the wheel axle 304 therethrough. The stator 180 may further include one or more, and more preferably, a plurality of electrically-conductive windings 186 formed about and carried by the main body 182. The electrically-conductive windings 186 may be connected to an external circuit and configured to enable an electrical current to flow to the external circuit. In the non-limiting example shown in the drawings, the stator 180 specifically includes three electrically-conductive windings 186, which have been schematically depicted. In some embodiments, the electrically-conductive winding or windings 186 may be made of copper. In one non-limiting example, each electrically-conductive winding 186 may include a minimum of three (3) individual copper wire coil windings, each configured to produce an electric current. The stator 180 may be stationary, such that the stator 180 does not rotate about the rotation axis 306; for instance and without limitation, the main body 182 may be secured or mounted to the surrounding framework or chassis of the vehicle.

The kinetic energy recovery system 100 further includes a magnetic cylinder or magnetic array cylinder 200 and a support structure 230. As will be described in more detail hereinafter, the magnetic array cylinder 200 may be attached to and jointly rotatable with the second disc 150 about the rotation axis 306, and may be arranged radially outward, surrounding and generally covering the stator 180. In turn, the support structure 230 may be fixed (i.e., non-rotatable) relative to the vehicle chassis, and may be arranged radially outward and over the magnetic array cylinder 200.

With reference to FIGS. 3 and 4, the magnetic array cylinder 200 may include a cylindrical, main body 202, which may be made of steel in some embodiments. A mounting flange 204 may extend radially outward at an outer, longitudinal end of the main body 202 arranged facing the inner side 154 of the second disc 150. In some embodiments, the mounting flange 204, which may be made of a non-ferrous material and may be attached to the main body 202 by an epoxy material, for instance and without limitation. The mounting flange 204 may include a plurality of fastener openings 206. A longitudinal through bore 208 may extend axially through the magnetic array cylinder 200, and more specifically, through the main body 202 and flange 204. As best shown in FIG. 5, the stator 180 is mounted within the longitudinal through bore 208. The wheel axle 304 extends through the longitudinal through bore 208. The fastener openings 206 may be arranged in angularly-spaced-apart positions around the longitudinal through bore 208 and about the rotation axis 306 of the wheel axle 304. The mounting flange 204 is shaped and sized to be received within the central recess area 159 of the second disc 150. The fastener openings 206 of the mounting flange 204 are configured to longitudinally align with the fastener openings 158 of the second disc 150 when the mounting flange 204 is seated into the central recess area 159. A respective lug, bolt, or other fastener, hereinafter referred to generally as fastener 190 (FIG. 5), may be fastened at each aligned pair of openings 206, 158 to secure the mounting flange 204 to the second disc 150.

The magnetic array cylinder 200 may include a plurality of external magnetic bands 210, which may be supported on or affixed to the main body 202 and extend around the main body 202 in longitudinally-spaced-apart positions relative to one another. For instance, the magnetic array cylinder 200 depicted herein include a pair of magnetic bands 210 arranged at or near opposite longitudinal ends of the main body 202. Alternative configurations are contemplated, such as having the plurality of magnetic bands 210 divided into two or more groups of magnetic bands 210, such as groups of three magnetic bands 210, where the magnetic bands 210 in each group are longitudinally spaced apart from one another a first distance, and the groups are in turn spaced apart from each other a second distance different than, and preferably greater to, the first distance. Each magnetic band 210 may be formed by a plurality magnets 211 (see FIG. 6) of equal polarity. The plurality of magnets 211 may extend generally along an entire periphery of (i.e. 360 degrees about) the rotation axis 306. In some embodiments, the magnets 211 may be slightly spaced apart from one another by gaps. In other embodiments, the magnets 211 may be arranged end-to-end or extending one immediately after the other, without gaps being defined between the magnets 211.

Figure 6:
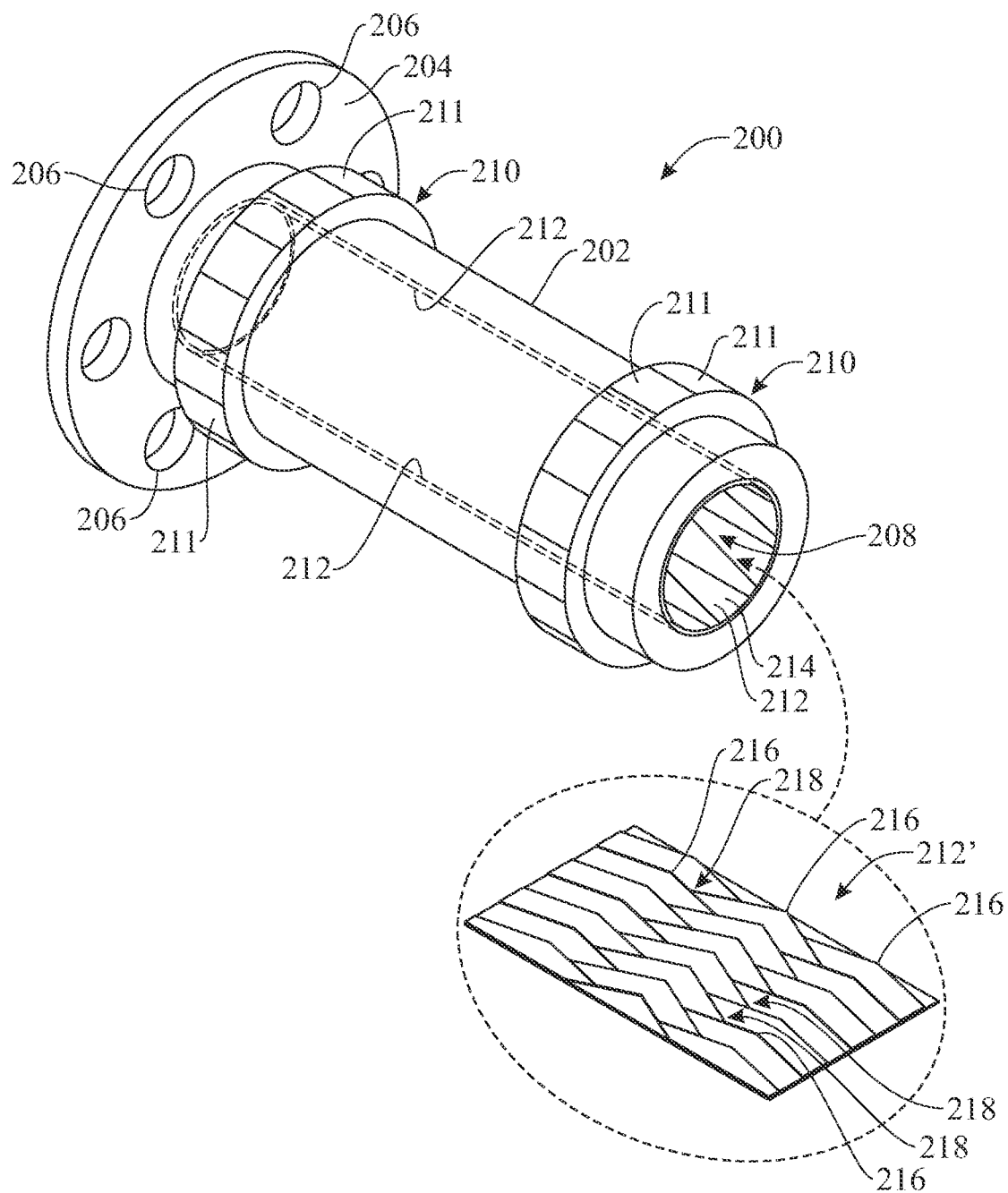
FIG. 6 presents an enlarged, isometric view of a magnetic array cylinder of the kinetic energy recovery system of FIG. 1, together with an auxiliary view, in flattened or unwrapped format, of an internal, magnetic array formed by a plurality of magnets.

As shown in FIG. 6, the longitudinal through bore 208 of the magnetic array cylinder 200 may be defined by an inner wall or side 212 of the magnetic array cylinder 200. In preferred embodiments, the inner side 212 of the magnetic array cylinder 200 may include a plurality of magnets 214, and more preferably, multiple or numerous magnets. In preferred embodiments, the plurality of magnets 214 provided along the inner side 212 may be arranged generally in an array formation, i.e. organized generally in rows and columns when observing the inner side 212 in a flattened or unwrapped configuration, as denoted by reference numeral 212' in FIG. 6. In preferred embodiments, the plurality of magnets 214 may be non-coplanar with each other (may have elevation changes) when the cylindrical inner side 212 is observed in flattened or unwrapped configuration 212'; i.e., the plurality of magnets 214 may not form a purely cylindrical surface when the cylindrical inner side 212 is observed in cylindrical form (denoted with reference numeral 212). For example, the plurality of magnets 214 may be arranged in overlapping configuration with one another, as shown in the unwrapped view or configuration 212', which protruding portions or peaks 216 of the magnets 214 protruding into the longitudinal through bore 208 and indentations or valleys 218 of the magnets 214 arranged radially outward with respect to the rotation axis 306 (i.e. away from the longitudinal through bore 208). Such non-coplanar, irregular surface of the plurality of magnets 214 may contribute to producing a greater electrical output during operation of the kinetic energy recovery system 100, as will described hereinafter.

Figure 7:
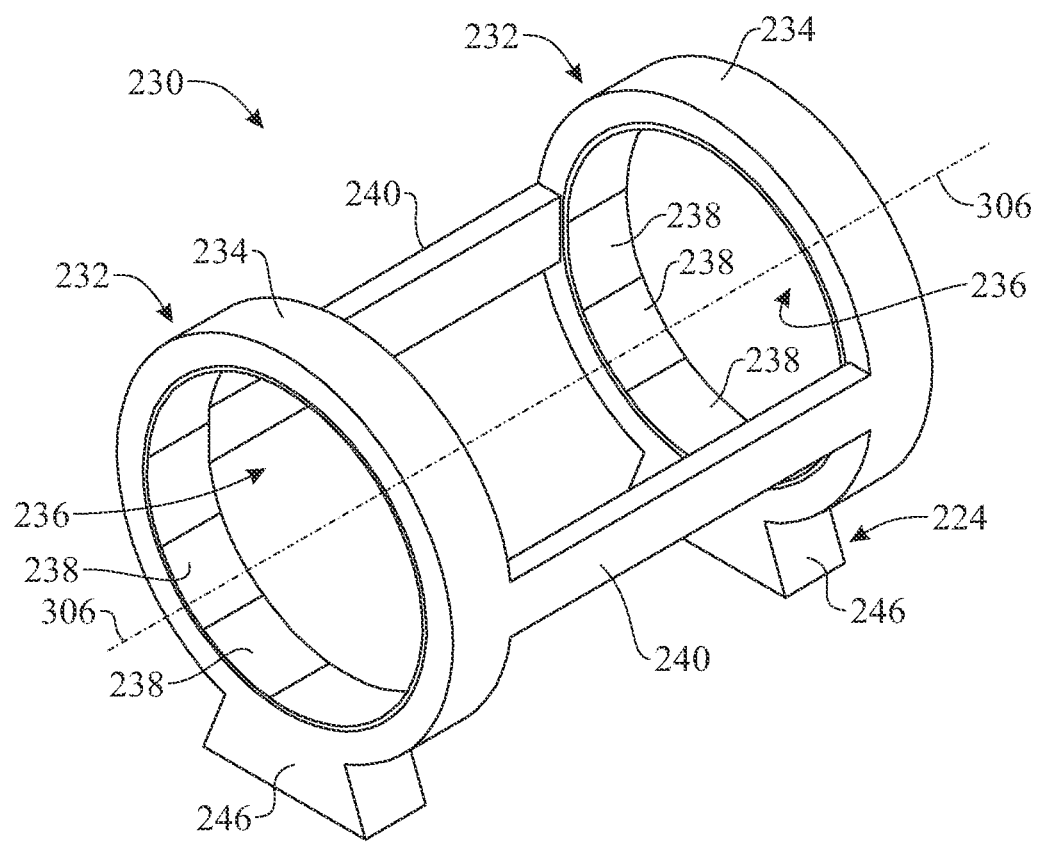
FIG. 7 presents an enlarged, isometric view of a support structure of the kinetic energy recovery system of FIG. 1.

The support structure 230, shown enlarged in FIG. 7, provides a support for the magnetic array cylinder 200. In some embodiments, the support structure 230 may be made of brass. This support structure 230 consists of a plurality of magnetic rings 232 (e.g., two magnetic rings 232, as shown), arranged in spaced-apart relationship and generally parallel with one another. The magnetic rings 232 are configured to extend over the magnetic bands 210 of the magnetic array cylinder 200, as shown for instance in FIG. 5. Each magnetic ring 232 may include a generally annular or ring-shaped body 234 defining an interior space 236, and a plurality of magnets 238 of equal polarity, and of the same polarity as the plurality of magnets 211 of the magnetic bands 210 of the magnetic array cylinder 200. In some embodiments, such as the present embodiment, the plurality of magnets 238 may be arranged on an inner side of the ring-shaped body 234 facing the interior space 236, preferably along an entire periphery of (i.e. 360 degrees about) the rotation axis 306. In some embodiments, the magnets 238 may be slightly spaced apart from one another by gaps. In other embodiments, the magnets 238 may be arranged end-to-end or extending one immediately after the other, without gaps being defined between the magnets 238.

As shown in FIG. 5, the magnetic rings 232 are configured to slide over the main body 202 of the magnetic array cylinder 200, with the main body 202 extending through the interior space 236 of the magnetic rings 232, allowing to create a passive repulsion magnetic field between the magnetic bands 210 and the magnetic rings 232 which causes the main body 202 to float and stabilizes the main body 202 on multiple planes. As further shown in FIG. 7, the magnetic rings 232 may be interconnected by one or more, and more preferably, two or more connecting bars 240. The connecting bar or bars 240 may extend along a longitudinal direction parallel to the rotation axis 306 of the vehicle wheel assembly 300, and generally parallel to the main body 202 of the magnetic array cylinder 200. In some embodiments, the support structure 230 may more specifically include two connecting bars 240 arranged in diametral opposition to one another with respect to the vehicle rotation axis 306. In some embodiments, the support structure 230 may include a mount 244 configured to attach to the vehicle chassis or frame in order to immobilize the support structure 230; for instance and without limitation, as shown for instance in FIGS. 3 and 4, the mount 244 may include two feet 246, where each foot 246 may be integrally-formed or otherwise affixed to a respective one of the ring-shaped bodies 234.

With continued reference to FIG. 5, the components of the kinetic energy recovery system 100, except the first disc 110, which is attached directly to the vehicle wheel assembly 300, may be mounted by sliding said components over the wheel axle 304 and arranging said components inboard of the tire 310, rim 312 and hub 314. As will be described hereinafter, the magnets 120, 160, 211, 214 and 238 carried by the different components of the kinetic energy recovery system 100 are configured to generate a plurality of magnetic fields which produce an electrical current, allowing to recover part of the kinetic energy of the rotating wheel 302. In a non-limiting example of the invention, the magnets 120, 160, 211, 214 and 238 described heretofore may comprise, and more preferably consist of, a plurality of rare earth, neodymium, permanent magnets.

Operation of the kinetic energy recovery system 100 is now described with reference primarily to FIGS. 5, 8 and 9. In an initial situation, shown in FIG. 8 and associated with normal vehicle operation, the vehicle wheel assembly 300 rotates with respect to the rotation axis 306 as indicated by arrow A. The rotating wheel 302 of the vehicle wheel assembly 300 is able to roll on a ground surface and thereby provide rolling mobility to the vehicle. More specifically, through intense friction between the rotating wheel 302 and the ground surface, the vehicle wheel assembly 300 may convert the rotational, kinetic energy of the wheel 302 into a translational kinetic energy applied on the vehicle by only using the contact patch of the tire.

Figure 8:
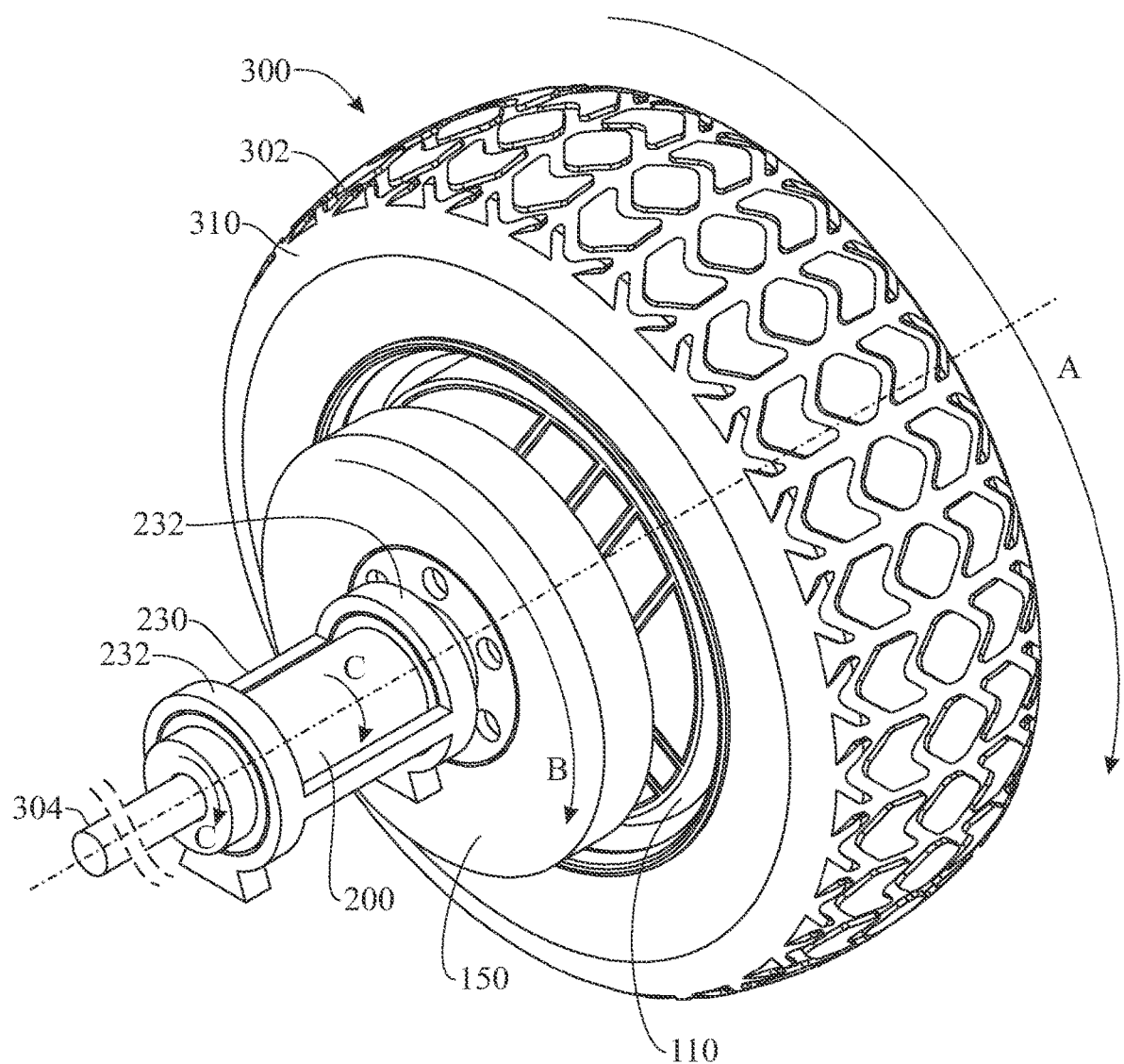
FIG. 8 presents a top isometric view of the kinetic energy recovery system of FIG. 1, with a first rotatable group (including the vehicle wheel) and a second rotatable group rotating independently from one another about a wheel rotation axis.

With continued reference to FIGS. 5 and 8, the first disc 110, which is secured to the wheel assembly 300, rotates jointly with the wheel assembly 300 about the rotation axis 306. Thus, the plurality of magnets 120 of the first disc 110 rotates about the rotation axis 306. As the plurality of magnets 120 of the first disc 110 have a different polarity than the plurality of magnets 160 of the second disc 150, and the first and second discs 110, 150 are sufficiently close to one another yet slightly separated with one another, as the first disc 110 rotates about the rotation axis 306, an attraction magnetic field between the plurality of magnets 120 of the first disc 110 and the plurality of magnets 160 of the second disc 150 causes the second disc 150 to also rotate on the bearing 140 and about the rotation axis 306, independently of the wheel axle 304 and the passive magnetic sleeve 170, in a "floating" manner and as indicated in FIG. 8 by arrow B. The second disc 150 is arranged in sufficient proximity to the first disc 110 to allow the plurality of magnets 120 on the first disc 110 and the plurality of magnets 160 on the second disc 150 to be sufficiently attracted to one another to generate a magnetic field which is not only capable of rotating the second disc 150 upon rotation of the first disc 110, but also is capable of maintaining the rotation of the second disc 150 as the first disc 110 continues to rotate.

With reference to FIGS. 5 and 8, as described heretofore, as the second disc 150 is secured to the magnetic array cylinder 200 by a plurality of fasteners 190, the magnetic array cylinder 200 jointly rotates with the second disc 150 about the rotation axis 306, as indicated by arrows C, independently of the jointly rotating, vehicle wheel assembly 300 and first disc 110. In turn, the passive magnetic sleeve 170, on which the bearing 140 operates, is tightly sleeved on the wheel axle 304 and thus jointly rotates with the wheel axle 304. Finally, the stator 180 and the support structure 230 are stationary and non-rotatable, as heretofore described.

Thus, the kinetic energy recovery system 100 of the present disclosure includes three different assemblies or part groupings: a first rotatable assembly, which rotates about the rotation axis 306 and comprises the vehicle wheel assembly 300, the first disc 110 (including the plurality of magnets 120), and the passive magnetic sleeve 170; a second rotatable assembly, which freely spins or "floats" about the rotation axis 306, independently of the first rotatable assembly, and comprises the second disc 150 (including the plurality of magnets 160), the magnetic array cylinder 200 (including the inner, plurality of magnets 214 and the outer, plurality of magnets 211 of the magnetic bands 210); and, a stationary or fixed group, or stationary or fixed assembly, which does not rotate about the rotation axis 306 and comprises the stator 180 (including the electrically-conductive windings 186) and the support structure 200 (including the plurality of magnets 238).

During operation of the kinetic energy recovery system 100, a plurality of passive magnetic fields are generated, and energy conversions are thereby produced between the different assemblies or part groupings. Specifically, a first passive magnetic field is generated between the first and second discs 110, 150, by means of a magnetic attraction of magnets 120, 160 of different polarity, by which rotational kinetic energy of the first disc 110 is converted into rotational kinetic energy at the second disc 150, and thus at the second rotatable assembly. A second passive magnetic field is generated between the passive magnetic sleeve 170 and the passive magnetic bearing 140, by means of magnetic repulsion of like polarity magnets comprised therein, by which rotational kinetic energy of the passive magnetic sleeve 170 is converted into rotational kinetic energy at the second disc 150, and thus at the second rotatable assembly. A third passive magnetic field is generated between the plurality of magnets 238 of the support structure 230 and the plurality of magnets 211 of the magnetic bands 210 of the magnetic array cylinder 200, which are of like polarity, by which a rotational energy is produced at the magnetic array cylinder 200, and thus at the second rotatable assembly.

The independently spinning or "floating", second rotatable assembly, driven for rotation by the aforementioned passive magnetic fields, generates a current at the electrically-conductive windings 186 of the stator 180, which may be delivered to an external electrical circuit as described heretofore. Specifically, as the second rotatable assembly rotates about the stator 180, a passive magnetic field is generated by the plurality of magnets 214 at the inner side 212 of the magnetic array cylinder 200 spinning about the rotation axis 306 and relative to the stationary, electrically-conductive windings 186 of the stator 180. The resulting electrical current at the electrically-conductive windings 186 may be directed to an external electrical circuit as heretofore described, such as for charging a vehicle battery, for instance and without limitation. The kinetic energy recovery system 100 is thus able to recover part of the kinetic energy of the spinning vehicle wheel assembly 300 to produce electrical current.

Figure 9:
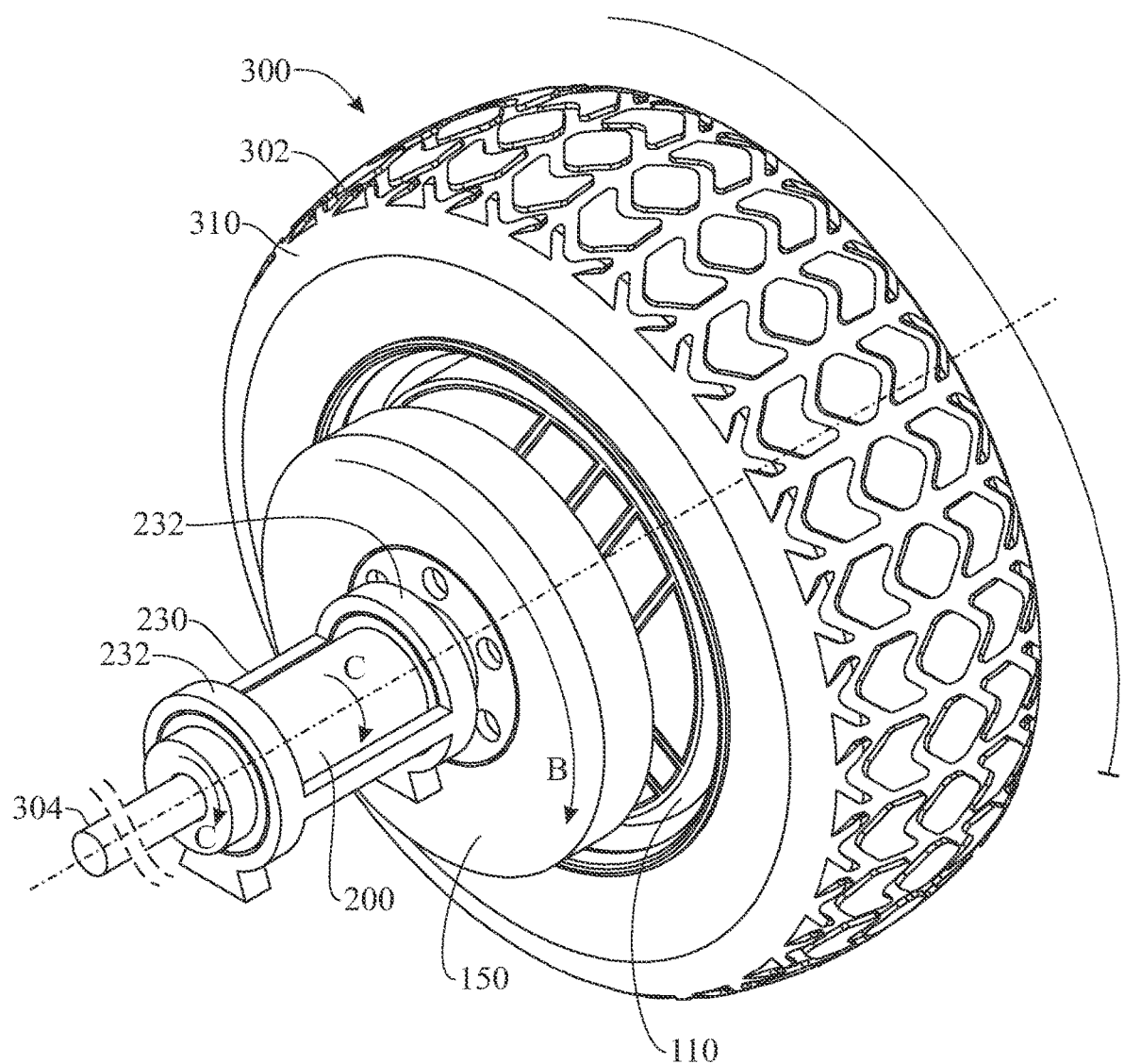
FIG. 9 presents a top isometric view, similar to FIG. 8, where the first rotatable group has stopped rotating and the second rotatable group continues to rotate about the wheel rotation axis.

As shown in FIG. 9, in having the second rotatable assembly able to "float" with respect to the first rotatable assembly, the second rotatable assembly is able to continue spinning by inertia on the bearing 140 and about the wheel axle 304 as the joint rotation of the first rotation assembly slows or stops. Thus, the kinetic energy recovery system 100 is able to continue to produce an electrical current at the stator electrically-conductive windings 186 for a limited time when the vehicle comes to a stop (the vehicle wheel assembly 300 and first rotatable assembly stop rotating), or until inertia slowly changes. Then, when the first rotatable assembly starts to turn again, the second rotatable assembly will begin to spin (if no longer spinning) or spin faster (if still spinning for said limited time), and electrical current produced at the stator electrically-conductive windings 186 will eventually increase. Therefore, the kinetic energy recovery system 100 of the present disclosure is capable of continuing to produce electricity to support a vehicle battery or for other uses even when the vehicle is stationary for a short time, such as at stop signs or red traffic lights.

In summary, the kinetic energy recovery system of the present disclosure uses part of the kinetic energy of a vehicle wheel or wheels to generate electrical power, which in turn may be used to recharge an electrical battery comprised the vehicle or to power additional or alternative electrical devices. Advantageously, the invention does not require the use of a dedicated electric motor. In a further advantage, the invention does not rely on friction between different parts but rather on magnetic fields and "floating" parts, thereby minimizing or substantially preventing friction-produced heat and energy loss, thus maximizing kinetic energy conversion into electrical energy at the stator. The kinetic energy recovery system may thus allow, for instance, for an electrical vehicle to require a smaller battery (lower battery capacity), which may contribute to reduce overall vehicle weight and cost, and may aid in battery cooling.

In some embodiments, the kinetic energy recovery system may be incorporated into vehicles of virtually any type, including trailers or towed vehicles. The system may also be incorporated into any of a vehicle's wheels, including front and rear wheels. The system may be incorporated to more than one wheel, and potentially all vehicle wheels, to maximize electrical current output.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A wasted kinetic energy recovery system, comprising:
   a first rotatable assembly, attachable to a vehicle wheel assembly to rotate jointly with the vehicle wheel assembly about a wheel rotation axis of the vehicle wheel assembly, the first rotatable assembly comprising a first plurality of magnets;
   a second rotatable assembly, comprising a second plurality of magnets and one or more rotor magnets; and
   a stationary assembly comprising a stator; wherein the wasted kinetic energy recovery system is configured to adopt a working configuration in which:
  the stationary assembly is mounted about the wheel axle of the vehicle wheel assembly and is non-rotatable about the wheel rotation axis,
  the first rotatable assembly is attached to the vehicle wheel assembly and is driven for rotation about the wheel rotation axis by and jointly with the vehicle wheel assembly, and
  the second rotatable assembly is mounted about the wheel axle and rotates about the wheel rotation axis with respect to the first rotatable assembly, the vehicle wheel assembly and the stationary assembly, wherein rotation of the second rotatable assembly with respect to the first rotatable assembly, the vehicle wheel assembly and the stationary assembly is driven by a first magnetic field produced between the first plurality of magnets of the first rotatable assembly and the second plurality of magnets of the second rotatable assembly, said rotation of the second rotatable assembly and of the one or more rotor magnets comprised therein producing an electrical current in the stator.

2. The system of claim 1, wherein:
the wasted kinetic energy recovery system is configured to automatically switch from the working configuration to an additional working configuration as a result of the first rotatable assembly and wheel rotation assembly ceasing to rotate with respect to the wheel rotation axis; wherein,
in the additional working configuration:
  the second rotatable assembly continues to rotate about the wheel rotation axis with respect to the first rotatable assembly, the vehicle wheel assembly and the stationary assembly, wherein rotation of the second rotatable assembly is driven by inertia, said rotation of the second rotatable assembly and of the one or more rotor magnets comprised therein producing an electrical current in the stator.

3. The system of claim 1, wherein the first rotatable assembly comprises a first disc, attachable to the vehicle wheel assembly, and the first plurality of magnets comprises a plurality of magnets carried by the first disc, and further wherein, in the working configuration, the first disc is attached to the vehicle wheel assembly and extends radially outward of and perpendicularly to the wheel rotation axis.

4. The system of claim 3, wherein the first disc is made of a non-ferrous material.

5. The system of claim 3, wherein, in the working configuration, the plurality of magnets carried by the first disc is arranged circumferentially about the first rotation axis.

6. The system of claim 3, wherein the first disc is attachable to a wheel hub of the vehicle wheel assembly, wherein, in the working configuration, the first disc is attached to the wheel hub and is concentric with the wheel hub about the wheel rotation axis.

7. The system of claim 6, wherein, in the working configuration, the plurality of magnets carried by the first disc is arranged radially outward of the wheel hub with respect to the wheel rotation axis.

8. The system of claim 7, wherein, in the working configuration, the plurality of magnets carried by the first disc is arranged surrounding the wheel hub around an entire periphery of the wheel hub.

9. The system of claim 3, wherein each magnet of the plurality of magnets carried by the first disc has an opposite polarity relative to adjacent magnets of said plurality of magnets carried by the first disc.

10. The system of claim 9, wherein each magnet of the plurality of magnets carried by the first disc is spaced apart from each adjacent magnet of said plurality of magnets carried by the first disc by a gap.

11. The system of claim 3, wherein the first disc comprises an inner side and an opposite, outer side arranged parallel to one another, wherein the plurality of magnets carried by the first disc is arranged closed to the inner side of the first disc than to the outer side of the first disc, and further wherein, in the working configuration, the inner and outer sides of the first disc are perpendicular to the wheel rotation axis and are oriented away from and towards a wheel of the vehicle wheel assembly, respectively.

12. The system of claim 11, wherein the plurality of magnets carried by the first disc is arranged on the inner side of the first disc.

13. The system of claim 3, wherein the second rotatable assembly comprises a second disc, wherein the second plurality of magnets comprises a plurality of magnets carried by the second disc, and further wherein, in the working configuration, the second disc extends radially outward of and perpendicularly to the wheel rotation axis, in parallel and spaced-apart relationship with the first disc.

14. The system of claim 13, wherein the second disc is made of a non-ferrous material.

15. The system of claim 13, wherein, in the working configuration, the second disc and the first disc are arranged in concentric and coaxial relationship with one another.

16. The system of claim 13, wherein the plurality of magnets carried by the second disc are of same polarity with respect to each other.

17. The system of claim 13, wherein the second disc comprises an inner side and an opposite, outer side arranged parallel to one another, wherein the plurality of magnets carried by the second disc is arranged closed to the outer side of the second disc than to the inner side of the second disc, and further wherein, in the working configuration, the inner and outer sides of the second disc are perpendicular to the wheel rotation axis and are oriented away from and towards a wheel of the vehicle wheel assembly, respectively.

18. The system of claim 17, wherein, in the working configuration, the plurality of magnets carried by the second disc are arranged circumferentially about the first rotation axis.

19. The system of claim 18, wherein, in the working configuration, the plurality of magnets carried by the second disc are arranged in angularly-spaced-apart, radial orientation with respect to the wheel rotation axis.

20. The system of claim 17, wherein the plurality of magnets carried by the second disc is arranged on the outer side of the second disc.

21. The system of claim 20, wherein the first disc comprises an inner side and an opposite, outer side arranged parallel to one another, wherein the plurality of magnets carried by the first disc is arranged on the inner side of the first disc, and further wherein, in the working configuration, the inner and outer sides of the first disc are perpendicular to the wheel rotation axis and are oriented away from and towards a wheel of the vehicle wheel assembly, respectively, the inner side of the first disc arranged facing and spaced apart from the outer side of the second disc, and the plurality of magnets carried by the first disc facing and spaced apart from the plurality of magnets carried by the second disc.

22. The system of claim 1, further comprising a bearing, wherein the bearing is mountable to the first rotatable assembly and the second rotatable assembly is mountable to the bearing, and further wherein, in the working configuration, the bearing is mounted to the first rotatable assembly and the second rotatable assembly is mounted to the bearing, the bearing enabling said rotation of the second rotatable assembly.

23. The system of claim 22, wherein the bearing comprises a passive magnetic repulsion bearing enabling a contact-free levitation of the second rotatable assembly with respect to the wheel axle of the vehicle wheel assembly during said rotation of the second rotatable assembly.

24. The system of claim 23, wherein the first rotatable assembly comprises a passive magnetic sleeve mountable onto the wheel axle, the bearing mountable onto the passive magnetic sleeve, and further wherein, in the working configuration, the passive magnetic sleeve is mounted onto and jointly rotatable with the wheel axle about the wheel rotation axis, the bearing is mounted and onto over the passive magnetic sleeve such that the passive magnetic sleeve is received within a through bore of the bearing, and the passive magnetic sleeve and the passive magnetic repulsion bearing repel each other promoting said rotation of the second rotatable assembly.

25. The system of claim 1, wherein the stator comprises a sleeve-like, main body, the main body comprising a longitudinal through bore configured to receive the wheel axle therethrough, the stator further comprising one or more electrically-conductive windings wound about and onto the main body.

26. The system of claim 25, wherein the one or more electrically-conductive windings comprise a plurality of electrically-conductive windings wound about and onto the main body.

27. The system of claim 26, wherein the plurality of electrically-conductive windings are arranged in longitudinally-spaced-apart relationship with one another along the main body of the stator.

28. The system of claim 25, wherein the second rotatable assembly comprises a magnetic cylinder comprising a generally cylindrical, main body having a longitudinal through bore, the longitudinal through bore defined by an inner wall of the main body of the magnetic cylinder, the magnetic cylinder comprising a plurality of magnets arranged on the inner wall of the main body, wherein, in the working configuration, the stator is received within the longitudinal through bore of the main body of the magnetic cylinder and the main body of the magnetic cylinder is arranged radially outward of the stator with respect to the wheel rotation axis.

29. The system of claim 28, wherein the plurality of magnets arranged on the inner wall of the main body of the magnetic cylinder are arranged forming an array.

30. The system of claim 28, wherein the plurality of magnets arranged on the inner wall of the main body of the magnetic cylinder comprise protrusions and indentations.

31. The system of claim 28, wherein the magnetic cylinder comprises a plurality of external magnetic bands extending around the main body of the magnetic cylinder about a central longitudinal axis of the main body of the magnetic cylinder at different longitudinal positions along the main body of the magnetic cylinder, and further wherein the stationary assembly comprises a support structure, the support structure comprising a plurality of magnetic rings of equal polarity to the plurality of external magnetic bands of the magnetic cylinder, wherein, in the working configuration, each magnetic ring of the plurality of magnetic rings of the support structure extends over and around an external magnetic band of the plurality of external magnetic bands of the magnetic cylinder, wherein a passive repulsion magnetic field between the plurality of magnetic rings of the support structure and the plurality of external magnetic bands of the magnetic cylinder promotes said rotation of the second rotatable assembly.

32. The system of claim 31, wherein each external magnetic band of the plurality of external magnetic bands comprises a respective plurality of magnets arranged in discrete, angularly-spaced-apart positions relative to one another about the central longitudinal axis of the main body of the magnetic cylinder.

33. The system of claim 32, wherein said respective plurality of magnets are of same polarity with respect to each other.

34. A wasted kinetic energy recovery system, comprising:
a first rotatable assembly, attachable to a vehicle wheel assembly to rotate jointly with the vehicle wheel assembly about a wheel rotation axis of the vehicle wheel assembly, the first rotatable assembly comprising a first plurality of magnets;
a bearing, mountable to the first rotatable assembly;
a second rotatable assembly, mountable to the bearing, the second rotatable assembly comprising a second plurality of magnets and one or more rotor magnets; and
a stationary assembly comprising a stator, wherein
the wasted kinetic energy recovery system is configured to adopt a working configuration in which:
the stationary assembly is mounted about the wheel axle of the vehicle wheel assembly and is non-rotatable about the wheel rotation axis,
the first rotatable assembly is attached to the vehicle wheel assembly and is driven for rotation about the wheel rotation axis by and jointly with the vehicle wheel assembly,
the bearing is mounted to the first rotatable assembly, and
the second rotatable assembly is mounted to the bearing and about the wheel axle and rotates about the wheel rotation axis with respect to the first rotatable assembly, the vehicle wheel assembly and the stationary assembly, wherein rotation of the second rotatable assembly with respect to the first rotatable assembly, the vehicle wheel assembly and the stationary assembly is enabled by the bearing and driven by a first magnetic field produced between the first plurality of magnets of the first rotatable assembly and the second plurality of magnets of the second rotatable assembly, said rotation of the second rotatable assembly and of the one or more rotor magnets comprised therein producing an electrical current in the stator; and
the wasted kinetic energy recovery system is configured to automatically switch from the working configuration to an additional working configuration as a result of the first rotatable assembly and wheel rotation assembly ceasing to rotate with respect to the wheel rotation axis; wherein,
in the additional working configuration:
the second rotatable assembly continues to rotate about the wheel rotation axis with respect to the first rotatable assembly, the vehicle wheel assembly and the stationary assembly, wherein rotation of the second rotatable assembly is driven by inertia, said rotation of the second rotatable assembly and of the one or more rotor magnets comprised therein producing an electrical current in the stator.

35. A wasted kinetic energy recovery system, comprising:
a first rotatable assembly, attachable to a vehicle wheel assembly to rotate jointly with the vehicle wheel assembly about a wheel rotation axis of the vehicle wheel assembly, the first rotatable assembly comprising a first plurality of magnets;
a passive magnetic repulsion bearing, mountable to the first rotatable assembly;
a second rotatable assembly, mountable to the passive magnetic repulsion bearing, the second rotatable assembly comprising a second plurality of magnets and one or more rotor magnets; and
a stationary assembly comprising a stator, wherein
the wasted kinetic energy recovery system is configured to adopt a working configuration in which:
the stationary assembly is mounted about the wheel axle of the vehicle wheel assembly and is non-rotatable about the wheel rotation axis,
the first rotatable assembly is attached to the vehicle wheel assembly and is driven for rotation about the wheel rotation axis by and jointly with the vehicle wheel assembly,
the passive magnetic repulsion bearing is mounted to the first rotatable assembly, and
the second rotatable assembly is mounted to the passive magnetic repulsion bearing and about the wheel axle and rotates about the wheel rotation axis with respect to the first rotatable assembly, the vehicle wheel assembly and the stationary assembly, wherein rotation of the second rotatable assembly with respect to the first rotatable assembly, the vehicle wheel assembly and the stationary assembly is enabled by the passive magnetic repulsion bearing and driven by a first magnetic field produced between the first plurality of magnets of the first rotatable assembly and the second plurality of magnets of the second rotatable assembly, said rotation of the second rotatable assembly and of the one or more rotor magnets comprised therein producing an electrical current in the stator; and
the wasted kinetic energy recovery system is configured to automatically switch from the working configuration to an additional working configuration as a result of the first rotatable assembly and wheel rotation assembly ceasing to rotate with respect to the wheel rotation axis; wherein,
in the additional working configuration:
the second rotatable assembly continues to rotate about the wheel rotation axis with respect to the first rotatable assembly, the vehicle wheel assembly and the stationary assembly, wherein rotation of the second rotatable assembly is driven by inertia, said rotation of the second rotatable assembly and of the one or more rotor magnets comprised therein producing an electrical current in the stator.

* * * * *